Patented Dec. 9, 1947

2,432,217

UNITED STATES PATENT OFFICE 2,432,217

PROCESS OF EXTRACTING PHYSIOLOGI-
CALLY ACTIVE PRINCIPLES

Marvin R. Thompson, Great Neck, N. Y., assignor
to William R. Warner & Co. Inc., New York,
N. Y., a corporation of Delaware No Drawing. Application July 14, 1943,
Serial No. 494,675

9 Claims. (Cl. 260—210)

The present invention relates to an extraction process. More particularly, this invention relates to a process for extracting active principles from vegetable or animal matter.

Drugs in the form of vegetable or animal drug concentrates have on the whole been marked by non-uniform characteristics due to the inclusion of numerous contaminants removed from the vegetable or animal matter along with the desired ingredients. These contaminants have rendered stabilization of dosage of such concentrates difficult because of the variation in pharmaceutical potency between batches due primarily to the existence in the various batches of variable quantities of contaminants, such as blood hemolyzing saponins and contact irritants (including emetics).

The presence of such contaminants has been due to the inability of manufacturers to exclude the contaminants from the concentrates with available extraction processes.

It is an object of the present invention to provide an extraction process which overcomes the foregoing defects.

It is another object of the present invention to provide an extraction process which makes it possible to extract desired vegetable or animal drugs from vegetable or animal matter to the exclusive of the contaminants existing concurrently in the vegetable matter.

It is a further object of the present invention to provide a process of extracting active principles from vegetable or animal matter and substantially at the same time exclude contaminants from the active principle concentrate.

Other objects and advantages if not specifically pointed out it will be apparent to those skilled in the art from the following detailed description of what is now considered the preferred embodiment of the invention:

The process of the invention in general comprises extracting soluble materials from plant or animal matter by means of a solvent, such, for example, as ethyl alcohol, partially concentrating the extract by partially evaporating the solvent, adding crushed ice to the partially concentrated extract to form a cold aqueous-solvent mixture in which the contaminants are insoluble, separating the insoluble matter from the concentrate, drying the concentrate to remove moisture to any extent desired or until the extracted drug exists in a form which can be pulverized and, when desired, pulverizing the extracted drug.

The invention accordingly comprises the several steps and the relation of one or more of such steps with respect to each of the others, and the product possessing the features, which are exemplified in the following detailed disclosure and the scope of the invention will be indicated in the claims.

The process of the present invention is capable of being employed to extract practically any desired vegetable or animal drug from vegetable or animal matter, for example, the following types of drugs:

1. Glycosidal
    Digitalis
    Strophanthus
    Squill
2. Alkaloidal
    Ergot
    Nux-vomica
    Belladonna
3. Certain neutral principles (sugar types).
    Cascara
    Senna
    Rhubarb
    Aloes
4. Resins
    Jalap
    Protophyllin
    Colocynth
    Scammony
5. Hormones
    Adrenals
    Thyroid
    Pituitary
    Ovary
    Testes By way of explanation of the invention and not in limitation thereof the process will be described in connection with the extraction of glycosides, such as those included in digitalis, from a glycoside bearing plant such as foxglove (digitalis leaf).

At the beginning of the process the digitalis leaf is thoroughly moistened with a suitable volatile solvent such as ethyl alcohol. Other volatile solvents may be used if desired, for example, petroleum ether, isopropyl alcohol or a mixture of solvents. The moistened digitalis leaf is transferred to a suitable extractor which is preferably of the vacuum extraction type and is extracted by use of the same solvent, a similar miscible solvent, or a suitable mixture of volatile solvents, at as low a temperature as possible which is preferably not in excess of 50 degrees C. The extraction is continued until the drug is exhausted. The percolate is then preferably transferred to an evaporator which is preferably of the vacuum type and the percolate is concentrated by the evaporation of the volatile solvent to any desired extent, for example until approximately seventy-five (75%) per cent of the solvent has been removed. The temperature throughout this operation is again maintained as low as possible, preferably not in excess of 55 degrees C.

The concentrate is then removed from the evaporator and is placed in a suitable container and approximately an equal weight of finely crushed ice is added to the concentrate with vigorous stirring until the ice is dissolved or melted. More or less ice may be used, as determined by the solubility of the contaminants present. The greater the solubility of the contaminants in the solvent, the larger the quantity of ice required. The majority of the contaminants existing in the concentrate at this point are insoluble in the cold aqueous-alcoholic solvent mixture so formed with the result that these contaminants separate from the solution and rise to the top in the form of fats, waxes and other light insolubles, or settle to the bottom as a heavy precipitate. The mixture is suitably decanted from the container and also suitably strained or filtered or centrifuged to remove all solid matter and leave a substantially pure solution of the desired active principles.

Instead of adding ice to the mixture, cold water just above the freezing point may be added, or water which has not been cooled may be added and the entire mixture suitably chilled to separate the contaminants from the mixture. It is preferred, however, that the ice be added directly to the mixture as this procedure apparently produces the most desirable results.

If a dry product is desired the solution thus prepared is passed through any suitable dryer, for example a drum or belt vacuum dryer, in which the moisture is evaporated until the extract exists in the form of a thin scale which is scraped from the drum or belt and thereafter suitably pulverized in any desired equipment. The solvent is recovered both from the dryer and the evaporator and reused for extraction purposes.

The powdered active principle extract so formed is of a remarkably pure character in that it is free from the waxes, fats, blood hemolyzing saponins and contact irritants which have existed in extracts heretofore made in substantial amounts. The substantially pure drug extract so formed may be used in powder form or dissolved in water, alcohol, and other solvents to form pharmaceutical products which are substantially uniform in regard to concentration and purity. This makes it possible to use the drug concentrate of the present invention to form products having uniform pharmaceutical potency with a minimum of the intermediate assaying steps formerly required because of the variable pharmaceutical potency of the extracts formerly employed.

In the extraction of the drugs of the resin group, group 4 above, the extracting menstruum is preferably rendered alkaline, for example, to a pH of 9, by the addition of a suitable alkaline material or substance such as caustic or ammonia. This insures that none of the drug will be coagulated and thereby precipitated from the solution.

Since certain changes in carrying out the above process and certain modifications in the article which embodies the invention may be made without departing from the scope thereof, it is intended that all matter contained in the above description shall be interpreted as illustrative and not in a limiting sense.

The invention having been described what is claimed is:

1. The process of extracting drugs soluble in a mixture of water and an organic solvent from drug-containing matter which comprises extracting soluble material from drug-containing matter with an organic volatile solvent for the drug, partially concentrating the extracted mixture, adding cracked ice to the partially concentrated mixture removing all solid matter from the resulting mixture and recovering substantially pure drug principles from the extract.

2. The process of extracting drugs soluble in a mixture of water and an organic solvent from drug-containing matter which comprises extracting soluble material from drug-containing matter with an organic volatile solvent for the drug, partially concentrating the extracted mixture, adding cracked ice to the partially concentrated mixture, thereafter removing all solid matter from the resulting mixture and removing moisture from the concentrated drug.

3. The process of producing an extract of digitalis which comprises dissolving soluble matter from digitalis leaf with ethyl alcohol, partially evaporating the ethyl alcohol from the extracted matter, adding cracked ice to the partially concentrated solution, removing undissolved materials from the resulting mixture and recovering substantially pure active digitalis principles from the extract.

4. The process of producing an extract of digitalis which comprises dissolving soluble matter from digitalis leaf with ethyl alcohol, partially evaporating the ethyl alcohol from the extracted matter, adding cracked ice to the partially concentrated solution, thereafter removing undissolved materials from the resulting mixture, and removing moisture from the digitalis extract.

5. The process of extracting drugs from drug containing matter which comprises extracting soluble material from drug containing matter with an organic volatile solvent for the drug, adding cracked ice to the extract so produced removing all solid matter from the resulting mixture and recovering substantially pure drug principles from the extract.

6. The process of extracting active principles soluble in a mixture of water and an organic solvent from matter containing the same which comprises extracting soluble material from the said matter with an organic volatile solvent for said active principles, adding cracked ice to the extract so produced removing all solid matter from the resulting mixture and recovering substantially pure drug principles from the extract.

7. The process of extracting active principles soluble in a mixture of water and an organic solvent from matter containing the same which comprises extracting soluble material from the said matter with an organic volatile solvent for said active principles, adding water at a temperature near the freezing point to the extract so produced removing all solid matter from the resulting mixture and recovering substantially pure active principles from the extract.

8. The process of extracting active principles soluble in a mixture of water and an organic solvent from matter containing the same which comprises extracting soluble material from said matter with an organic volatile solvent for said active principles, adding cold water to the extract so produced removing all solid matter from the resulting mixture and recovering substantially pure active principles from the extract.

9. The process of extracting active principles soluble in a mixture of water and an organic solvent from matter containing the same which comprises extracting soluble material from the said matter with an organic volatile solvent, adding water to and chilling the extract so produced removing all solid matter from the resulting mixture and recovering substantially pure active principles from the extract.

MARVIN R. THOMPSON.

REFERENCES CITED

The following references are of record in the file of this patent:

UNITED STATES PATENTS

| Number | Name | Date |
|---|---|---|
| 1,758,616 | McGavack | May 13, 1930 |

FOREIGN PATENTS

| Number | Country | Date |
|---|---|---|
| 383,480 | Germany | Oct. 13, 1923 |
| 434,264 | Germany | Sept. 22, 1926 |